United States Patent [19]

Merget et al.

[11] 4,120,980

[45] Oct. 17, 1978

[54] PROTEIN-RICH FOODSTUFFS FOR RUMINANTS

[75] Inventors: Norbert Merget, Bochum; Friedhelm Koch, Dülmen, both of Germany

[73] Assignee: Veba Chemie Aktiengesellschaft, Gelsenkirchen-Buer, Germany

[21] Appl. No.: 721,631

[22] Filed: Sep. 8, 1976

[30] Foreign Application Priority Data

Sep. 11, 1975 [DE] Fed. Rep. of Germany ....... 2540457

[51] Int. Cl.$^2$ ............................ A23L 1/18; A23L 1/22
[52] U.S. Cl. .................................... 426/69; 426/656; 426/657; 426/807
[58] Field of Search ................... 426/2, 69, 656, 657, 426/807

[56] References Cited

U.S. PATENT DOCUMENTS

| | | | |
|---|---|---|---|
| 2,965,488 | 12/1960 | Belasco | 426/69 |
| 3,619,200 | 11/1971 | Ferguson et al. | 426/2 |
| 3,630,751 | 12/1971 | Ushioda et al. | 426/2 |
| 3,875,310 | 4/1975 | Rawlings et al. | 426/69 X |
| 3,988,480 | 10/1976 | Ames et al. | 426/2 |

*Primary Examiner*—Robert A. Yoncoskie
*Attorney, Agent, or Firm*—Burgess, Dinklage & Sprung

[57] ABSTRACT

An improved ruminant feed containing rumen stabilized particulate proteinaceous feed material which is unstable in solutions having a pH value smaller than 4 and relatively stable in solutions having a pH value larger than 5, said feed composition including at least one non-proteinaceous nitrogen compound. The non-proteinaceous nitrogen compound is present in a weight ratio of 0.1 to 10.0 based upon the weight equivalents of nitrogen in the rumen stabilized albuminous component.

4 Claims, No Drawings

PROTEIN-RICH FOODSTUFFS FOR RUMINANTS

BACKGROUND OF THE INVENTION

1. Field of the Invention

This invention relates to ruminant feedstuffs and feedstuff supplements. More particularly, this invention relates to ruminant feedstuffs and feedstuff supplements containing a particulate proteinaceous feed material which has been rendered relatively stable to solutions having a pH value larger than 5 but unstable in solutions having a pH value smaller than 4 by treatment with an aldehyde or polymer based on vinyl or acrylic monomers. The feedstuff of the present invention is improved in that there is included at least one nonproteinaceous nitrogen compound, especially present in a weight ratio of 0.1 to 10.0, based upon the nitrogen content of the first stomach stabilized particulate proteinaceous feed material.

DISCUSSION OF THE PRIOR ART

In the rumen of ruminants various processes simultaneously occur and are influenced by feed substances. These processes involve the formation of microbial protein from proteinaceous matter in the feed. Absorbed feed protein is first decomposed there to nonproteinaceous compounds while microbial protein is simultaneously formed from nonproteinaceous compounds. However, the synthesis of the microbic protein in the omacum depends on the nitrogen supply which is provided primarily by ammonia and only secondarily by peptides and amino acids.

In tests on cows with rumen and duodenum fistules it was determined that, with sufficient supply of nitrogen compounds, the amount of the microbial protein synthesis depends only on the energy supply, expressed in starch units (StE).

In addition, tests showed that the proteolysis of the food protein in the omacums is independent of the amount of the protein constituent and averages about 70%. Therefore, one can assume that 30% of the proteins inserted reach the intestines, whereas 70% are decomposed in the rumen or serve to produce bacterial protein.

A high synthesis rate of microbial protein in the rumen requires also a high concentration of easily-soluble carbohydrates for the energy supply. For the preparation of nitrogen-containing compounds for the protein synthesis, the ruminant has available a very elastic regulation system over the rumino-hepatic cycle. Such is partially controlled by means of the $NH_4^+$-content in the first stomach. In case of low nitrogen contents in the rumen, much $NH_3$ or urea can diffuse back from the blood stream into the rumen and serve as a nitrogen supply for the bacteria. In case of high $NH_3$ contents in the rumen, the same is resorbed over the wall of the rumen and eliminated as urea in the urine. A small deficiency of nitrogen in the rumen can be adjusted through reflux and leads thereby to an altogether better utilization of the nitrogen.

The energy dependency of the bacterial protein synthesis is of vital importance for the utilization of non-protein-nitrogen-(NPN) compounds. Tests showed a linear dependency between the production of bacterial proteins and the amount of the energy supply. Thus, about 10 g of bacterial protein are synthesized per 100 starch units.

Decisive for the supply of the ruminant with protein is not only the amount of protein contained in the feed, but also the amino acids available for the resorption in the intestine. These amino acids come from two sources, the feed protein not decomposed in the rumen and the microbial protein produced through microbial synthesis.

Protein and energy in the feed correspond then to the microbial requirement when they are present at the ratio of 1:7. For the supply of the energy and protein requirement of the milk cow at high milk output, a ratio of 1:4.5–6 is necessary, however.

However, at normal feeding, protein amounts higher than 1:6–7, referred to StE (starch unit) are connected with greater losses of urea by way of the urine. If protein is also substituted by urea in ratios having a narrower proportion than 1:7, then the protein available to the animal at the intestines again decreases by this amount, i.e., in order to improve the protein supply for the ruminant, a certain optimal proportion of energy to protein which results from the fermentation quota of the protein must be considered.

Only the protein in the feed ration fermentable in the rumen can be substituted by fermentable NPN-compounds equivalent with respect to nitrogen without influencing the protein supply of the ruminant. According to the instant invention the protein in the feed is treated such that it is not digested in the rumen and passes to the intestines where it is enzymatically decomposed. The treatment of the protein so that it is not digested in the rumen is per se known.

That is, when inserting the foodstuff according to the instant invention, the valuable amino acids pass to the greatest degree directly into the intestine. The flora of the rumen, which receives its N-requirement such as by means of ammonia and/or means of higher organic N-compounds, is supplied by means of added NPN compounds.

When substituting feed proteins with NPN compounds in conventional feed mixtures, two effects appeared. On the one hand, the amount of nitrogen soluble in the rumen increases whereby NPN compounds are completely soluble. On the other hand, 30% less of such compounds rush towards the intestines, as compared to those that would have reached the intestines undecomposed if protein had been inserted. This increased N-level in the rumen remains without influence on the bacterial protein synthesis since the energy/crude substance ratio does not change.

However, if proteins are used which are rumen stabilized and which reach the intestines mostly undecomposed, then the portion of rumen-soluble N decreases. The added NPN compound, added in accordance with the invention, is substantially incorporated into the bacterial protein.

In German Pat. No. 1,692,412 there is described a process for the production of rumen-stable proteins wherein proteins are supplied with a covering through an aldehyde, e.g., formaldehyde, or by application of a polymer layer based on basic vinyl or acrylic monomers so that they are stable in the rumen at a pH value larger than 5 and unstable within the pH range similar than 4.

This patent describes further the use of these proteins to improve the protein supply of ruminants thereby that more feed proteins reach the intestine, i.e., it describes only the better protein supply in the abomasum and small intestine. There is not disclosed the concomitant augmentation and/or maintenance of the N supply for formation of bacterial or microbial proteins by the action of the rumen.

SUMMARY OF THE INVENTION

The subject matter of the instant invention are now feedstuffs or feedstuff supplements for ruminants, which also supply the rumen flora sufficiently with nitrogen, which feedstuffs or supplements comprise particulate proteinaceous feed material of vegetable, animal and/or synthetic origin, the particulate proteinaceous constituent being rendered less sensitive to the digestive juices of the rumen of a ruminant through treatment with an aldehyde or a polymer based on basic vinyl or acrylic monomers. The particulate proteinaceous feed component of the feed is unstable in solutions having a pH value smaller than 4 and relatively stable in solutions having a pH value larger than 5. The feed is improved in that there is also present non-protein-nitrogen compounds. These latter compounds are present at a weight ratio of 0.1 to 10.0, referred to the nitrogen equivalence of the rumen-stabilizing, albuminous component.

A favorable embodiment of the invention is one in which the feed contains 0.25–2.0 weight equivalents of non-proteinaceous nitrogen compounds per equivalent nitrogen content in the rumen stabilized particulate proteinaceous feed component. Preferably, the non-proteinaceous nitrogen compounds employed is urea.

Therefore, the use of the inventive combination of protected amino acids and other particulate proteinaceous feed compounds and non-proteinaceous nitrogen (NPN) compounds allows one to supply all the nitrogen required for the feeding of the rumen flora via the NPN compounds. The different, more valuable, amino acids are saved for the resorption in the intestine. Through this recipe the degree of utilization of the NPN compounds is improved and the supply of the ruminant with protein is economically more favorable.

In this invention, the different protein requirements of the ruminant are detected for the first time re the microbial protein synthesis and the protein requirement. Thus, the amount of available protein in the intestine can be regulated.

Every material of vegetable, animal or synthetic origin can be used as particulate proteinaceous feed material. Furthermore, in the following, the term "proteinaceous" is used for individual amino acids alone, for polypeptides and amino acid compositions, for mixtures of polypeptides and amino acids, as well as also for natural protein.

To prepare the feed according to the instant invention, or the feed compositions, all particulate proteinaceous foodstuffs can be used. Preferably, protein rich foodstuffs are used such as oil extraction scraps and oil cakes, soy scraps, peanut scraps, single cell proteins from bacteria, yeast and algae, seaweed and proteins obtained from mushrooms (fungi) and other known protein feeds alone or in combinations.

The stabilization of the proteins can take place through aldehydes, especially formaldehyde, in such a manner that a stable cover is produced on the proteinaceous particle, which, as described above, is insoluble at pH 5 and above, although soluble within the acid range (pH 3–4). The surface protection of the particulate protein supply through the formation of a uniform layer of polymers of basic vinyl and/or acrylic monomers can also be performed. German Pat. No. 1,692,412 gives information for the preparation of such rumen stable protective layers. The preparation of the stabilized particulate proteinaceous feed materials is per se known.

Suitable non-protein-nitrogen compounds (NPN compounds) according to the instant invention are all soluble, including poorly soluble, nitrogen compounds which are also not toxic and can be decomposed in the rumen so far that they can be called upon for the synthesis of bacterial proteins. The most important groups of these compounds are amides such as of the carbon dioxide and of the aliphatic $C_1$–$C_4$ monocarboxylic acid, e.g., urea, formamide, acetamide, propionamide and derivatives derived therefrom, N-monoacetyl urea, N-monopropionyl urea, N,N'-dipropionyl urea, as well as their salts, e.g., phosphates, sulfates and others, condensation and addition products such as guanidine, biuret, aldehyde-urea condensation products, e.g., with formaldehyde, acetaldehyde, propionaldehyde (propylidene mono-urea, propylidene-diurea), isobutylaldehyde (isobutylidene diurea), crotonaldehyde (crotylidene diurea), and the like, as well as the ammonium salts of inorganic and organic acids, of the phosphorus (also of the polymeric form), nitric, (however, only in small amounts) sulfuric, carbonic acid and others, as well as of the carbamine, acetic, propionic, butyric, lactic, malic, tartaric, fumaric acid and others. Of course, compositions of the above-mentioned compounds can also be used.

The addition of the NPN compounds takes place in the simplest case, on the basis of nitrogen equivalents, at the ratio of 1:1. If the feed is used in StE rich, but protein poor rations, then a greater NPN addition will make possible a favorable protein utilization. However, for the addition to protein-rich fundamental feed, a reduction of the NPN constituent is advantageous (detailed explanations are given in the following examples).

For the stabilization, proteins with small particle size are used advantageously, preferably between 0.1 mm and 1 mm diameter, the relative thickness should be close to 1.

These properties which contribute to reducing the residence time of the stabilized protein in the rumen is as small as possible. On the other hand, the residence time is long enough, however, to let the NPN compound dissolve.

The subject matter of the invention is illustrated by means of the following examples.

EXAMPLE 1

Preparation of a protein-rich foodstuff and exchangeability of the stabilized protein with an NPN-compound (urea).

A commercial soy scrap having an in-vitro digestibility of the crude protein of 70% (rumen juice incubation) was treated with 0.5 weight % of formaldehyde.

a. The in-vitro digestibility was thereby reduced to 10%. From this product 60% less of the raw protein is liberated in the rumen. This corresponds to 3.75 g nitrogen per 100 g of soy. The quantity of protein deprived from the rumen as a result of the treatment of the protein was compensated by addition to the soy protein of easily soluble urea in a nitrogen equivalent amount. Thereby the original digestibility of the protein was retained (33% treated soy protein and 66% protein from NPN, i.e., from urea).

This composition can, according to the raw protein content, replace soy scrap in conventional concentrated feed mixtures.

b. An easily-soluble soy scrap with an in-vitro digestibility of 70% was treated with 0.3 weight % formaldehyde. The digestibility of the composition in the juice of the rumen was thereby reduced to only 30%. The stabilized amount was replaced with urea to thereby raise the amount of nitrogen absorbed by the rumen.

As is evident from Table 1, one can control the digestibility of the feed in the rumen so that a total amount of nitrogen is absorbed while ensuring that proteinaceous nitrogen in large quantities reaches the abomasum for digestion and absorption in the duodenum.

TABLE 1

|  | Rate of Exchange* | Digestibility in the first stomach(%) |
|---|---|---|
| Untreated soy protein | — | 70 |
| Treated soy protein | — | 30 |
| Treated soy protein + 57.2% protein from NPN compounds | 1:1 | 70 |
| Treated soy protein + 28.6% protein from NPN compounds | 1:0.5 | 50 |
| Treated soy protein + 14.3% protein from NPN compounds | 1:0.25 | 40 |

*Definition of the term exchange rate:
The exchange rate refers to the portion of fermented feed protein such that only fermentable protein is exchanged against NPN.

EXAMPLE 2

Calculation of the Protein Fractions

It shall be shown by means of this example how the protein in the duodenum is composed depending on the feeding:

a. The maintenance requirement of a milk cow normally requires 3,000 StE and 300 g digestible protein. At standard feeding 210 g (i.e. 70%) of digestible protein are usually fermented in the rumen, while 90 g (30%) reach the intestine. The bacterial protein synthesis, depending on the added StE, amounts to 300 g protein, i.e., there is an effective under-supply of N-containing compounds in the first stomach (corresponding to 90 g protein).

If the protein requirement is covered only by NPN compounds, then the N-amount corresponding to 300 g protein is set free in the first stomach and absorbed as bacterial protein through microbial synthesis.

Of course, it is more realistic to replace only a portion of the protein in the feed with NPN compounds, e.g. 20%, i.e., in this case 60 g protein would be replaced with an NPN compounds (such as diammonium phosphate).

The 240 g feed protein are fermented in the rumen to 168 g (i.e. 70%) bacterial protein, while 72 g reach the intestine directly. The protein at the duodenum (300 g) is comprised in this case of 228 g bacterial protein and 72 g untreated feed protein without consideration of the rumino-hepatic cycle.

Therefore, in all three cases the animal has always available 300 g protein at the duodenum. Limiting for the maintenance requirement coverage is only the N-supply at the first stomach.

In case of the maintenance requirements, the protein requirement can be completely covered by NPN compounds.

b. A milk cow with a milk capacity of 20 liter per day has a feeding requirement (including maintenance requirement) of 8,500 StE and 1,500 g digestible protein.

At normal feeding, 1,050 g (i.e. 70%) of this are fermented in the rumen and 850 g bacterial protein is formed therefrom (corresponding to 10 g/100 StE). Therefore, only 1300 g digestible protein are effectively available at the duodenum to the animal, which are to be considered as covering the requirement.

Therefore, if the protein requirement is referred to the protein available at the duodenum, then 1,300 g digestible protein (300 g for maintenance, 50 g per 1 liter of milk) can be set forth as requirement.

If also in this case all protein is added in the form of NPN compounds, then the maximum protein amount at the duodenum amounts to only 850 g protein (corresponding to 8.500 StE), i.e., the NPN compound can only be utilized at about 57%, and there results a protein deficiency at the duodenum of 450 g compared to the normal protein feeding. If also in this case only 20% of protein required are covered by NPN compounds, then the 1,200 g digestible feed protein are converted into 840 g (70%) digestible bacterial protein in the rumen and 360 g (30%) reach the intestine directly.

Of the 300 g protein-N, only 10 g bacterial protein can yet be formed (because of StE formation of maximum 850 g possible). This corresponds to a utilization degree of 3.3%.

Altogether, 1,200 g digestible protein are available to the animal at the duodenum.

EXAMPLE 3

Feeding of the ruminant with rumen stable proteins.

a. When using first stomach stable proteins (fermentation rate 10% vis a vis 70% with untreated feed proteins) to cover the maintenance requirement, 270 g protein go directly into the duodenum, while only 30 g are available for the microbial synthesis in the rumen.

When covering the maintenance requirement, there is no advantage when using rumen-stable proteins since here the microbial protein synthesis in the rumen is limited by low availability of N-containing substance.

b. The foodstuff norms for milk cows are aimed at untreated protein. As was shown in Example 2, a milk cow with a milk capacity of 20 liter milk per day, at normal feeding at the duodenum and thereby at the place of the resorption, has only 1,300 g digestible protein available. Since the norms are derived from feeding results with untreated protein, the actual requirement is covered with 1,300 g protein at the duodenum, this corresponds to 50 g protein per 1 liter milk and 300 g digestible protein for the maintenance.

Since by use of rumen-stable proteins, the direct availability of the required protein content at the duodenum is provided without causing losses in the rumen, a requirement at the duodenum of 1,300 g protein can be expected here, i.e., vis a vis untreated protein, 17% protein can be saved when covering the requirement for the milk output capacity.

Therefore, if the cow is supplied in the ration with 1,300 g protein of rumen-stable proteins with a fermentation rate of 10% in the rumen, then the protein measurable at the duodenum is composed of 1,170 g undecomposed protein and 130 g bacterial protein, a substantial N-deficit still existing in the rumen.

Inventive is, however, not the simple exchange of feed protein against rumen-stable proteins and NPN compounds, but the directed guarantee of the animal requirement with untreated protein as far as it exceeds the microbial protein synthesis, i.e., in case of a cow with a milk output of 20 liter per day, the ration must have the N-amount equivalent to 850 digestible protein of easily fermentable compounds and 450 g of digestible protein must pass the rumen undecomposed, i.e., the fermentation rate of the feed protein must amount to 65%, a mixture of 61.2% of an NPN compound and 38.8% first stomach stable-proteins corresponds to this.

EXAMPLE 4

The use of rumen-stable proteins in the condensed feed can be comprehended as follows, in terms of a model:

A milk cow with a milk capacity of 20 liters per day has a feeding requirement of 8,500 StE and 1,500 g digestible protein. The basic feed is to be sufficient for maintenance and production of 8 liters of milk per day. It contains 780 g protein, of which 546 g (i.e. 70%) ferments in the rumen and 234 g (30%) can be resorbed directly in the intestine, in the concentrated feed 720 g protein are added.

Commercial soy scrap is decomposed at about 70% in the rumen; through a formaldehyde treated, the decomposition rate was reduced, however, to 30%. According to the invention, these 40% rumen stable proteins can be replaced with an NPN compound (urea . $H_3PO_4$), so that the feed is additionally fermented to 70%, i.e., the protein removed from absorption in the rumen is replaced with an equivalent amount of nitrogen in the form of NPN compounds.

With the use of commercial soy scrap, 216 g (i.e. 30%) protein arrive directly in the intestine, while 504 g (70%) are fermented in the rumen.

The total balance sheet then looks as follows:

1,050 Decomposed protein in the rumen and 450 g untreated feed protein in the abomasum, i.e., in the rumen there are 200 g protein more available than can be absorbed by the rumen bacteria (850 g). Therefore, only 1,300 g protein could be resorbed together, i.e., 850 in the rumen and 450 in the abomasum.

If the 40% of additionally stabilized protein are replaced at the ratio of 1:1 N-equivalent through NPN compounds, i.e., a mixture of 42.8% treated soy and 57.2% protein of an NPN compound is inserted, then the balance sheet does not change.

According to the invention, these 40% additionally stabilized protein can, however, also be replaced in other ratios such as, for instance, 1:0.5, i.e., 50% of the insoluble protein are replaced by NPN compounds. Thus the following balance results:

The condensed feed contains altogether 720 g digestible protein, of whixh 514 g (71.4%) are present as stabilized protein and 206 g (28.6%) as NPN compound, the average decomposition rate in the rumen amounts to 50%.

According to the balance sheet, 906.2 g protein are decomposed in the rumen (546 g as basic feed, 206 g from NPN compound and 154.2 g from stabilized soy scrap) and 594 g protein (360 g from stabilized soy scrap and 234 g from basic feed) arrive together at the intestine.

Altogether, 1,440 g available protein will therefore reach resorption in the intestine, i.e., 140 g protein more than with untreated soy scrap. The requirement is surpassed by this method using a combination of stabilized protein feed and non-proteinaceous nitrogen compounds.

In this case, there are still 56.2 g protein more liberated in the rumen than can be built into the protein by the bacteria. Therefore, there are still small losses in this amount. On the other hand, 140 g digestible protein more than is required is rushed to the duodenum.

If one now reduced the protein content of the concentrated feed by 100 g, i.e., instead of 720 g, only 620 g are added, the amount released in the rumen and the amount floating towards the duodenum changes by always 50 g, i.e., the losses in the rumens practically become like zero, at the duodenum 90 g more are floating than corresponds to the requirement. By a change of the mixing ratio in favor of NPN and thus an increase of the fermentation quota to more than 50%, the protein amount required in the concentrated feed could be reduced further, for instance, at a fermentation rate of 60% and an addition of 520 g protein in the first stomach, 858 g (312+546) protein would be decomposed and built into bacteria protein. At the duodenum there would be 1,292 g protein (850 from microbial protein and 254 g from basic feed and 208 g from the concentrated feed) would be available. The composition of the concentrated feed with a fermentation rate of 60% consists of 44.5% soy scrap (10% fermentation rate) and to 55.5% of the NPN compound. With this combination, the requirement can be covered with an expenditure reduced by 200 g protein.

EXAMPLE 5

In this example the fermentation of the feed protein is presented for normal feeding of the milk cow for various milk capacities.

By means of three different feed combinations:
1. Untreated protein with a decomposition rate of 70% in the rumen (see Table 2, columns 7, 8).
2. Combination of 50% untreated protein (decomposition rate 70%) and 50% rumen stabilized proteins (decomposition rate 10%). Average decomposition rate 40% (see Table 2) columns 9, 10).
3. Combination of each 50% untreated protein and 50% inventive feed (combination 70% rumen-stable proteins + 30% NPN compound on N-basis (for instance urea). Average decomposition rate 53.5% (see Table 2) columns 11, 12)

is shown. These protein contents are respectively decomposed in the rumen to the extent indicated (See Table 2, columns 7, 9, 11) and to the extent to which they contribute to the N-supply of the rumen bacteria (see Table 2, columns 8, 10, 12).

It becomes evident that at sole feeding of untreated proteins (see Table 2, columns 7, 8) a substantial N-excess exists in the rumen, which becomes evident through protein losses.

When using first stomach-stable protein without NPN addition, there exists a larger protein deficiency in the rumen so that the desired maximal bacterial protein synthesis in the rumen is not guaranteed (see Table 2, column 10). If the combination according to the instant invention is added to the untreated proteins, then it becomes evident that at low milk capacities only a small protein deficiency exists in the rumen. In case of high-capacity animals the N-requirement of the rumen bacteria is about covered. It is known that low capacity animals can equalize this small deficit over the rumino-hepatic cycle.

Therefore, an altogether very good utilization of the feed protein is obtained, especially the already added NPN compounds are completely utilized.

These tests were conducted with soy scrap, stabilized soy scrap and urea.

TABLE 2

| Milk capacity Kg/d | Food requirement Energy StE | Food requirement digestible protein g | nutrient ratio | Microbial protein synthesis according to StE g | | I untreated protein Fermented Food Protein 70% Requirement coverage for microbial protein synthesis. | | II 50% untreated protein 50% P.P¹ (Fermentation rate 10%) Fermented Food Protein 40% requirement coverage | | III 50% untreated protein +35% P.P.¹ +15% Non-Protein Nitrogen² Fermentation Quota 53.5% requirement coverage | |
|---|---|---|---|---|---|---|---|---|---|---|---|
| | | | | g | % | g | % | g | % | g | % |
| 10 | 5 750 | 900 | 1:6,4 | 575 | 64 | 630 | 109.6 | 360 | 63 | 482 | 83.7 |
| 15 | 7 125 | 1200 | 1:5,9 | 713 | 59 | 840 | 117.8 | 480 | 67 | 642 | 90.0 |
| 20 | 8 500 | 1500 | 1:5,7 | 850 | 57 | 1 050 | 123.5 | 600 | 71 | 803 | 94.4 |
| 25 | 9 875 | 1800 | 1:5,5 | 988 | 55 | 1 260 | 127.5 | 720 | 73 | 963 | 97.5 |
| 30 | 11 250 | 2100 | 1:5,4 | 1125 | 54 | 1 470 | 130.6 | 840 | 75 | 1 124 | 99.8 |

¹P.P.-rumen-stable protein
²NPN-urea was chosen as example

What is claimed is:

1. A foodstuff or foodstuff supplement for ruminants comprising a particulate proteinaceous feed material of vegetable, animal or synthetic origin, the surface of the particle thereof having been treated with a member selected from the group consisting of an aldehyde and a vinyl or acrylic polymer whereby the proteinaceous component is substantially resistant to digestion in the rumen of a ruminant but digestable in the small intestines of said ruminant and a non-proteinaceous nitrogen compound, said compound being present in a weight equivalent ratio of 0.1 to 10.0 with respect a nitrogen equivalent content of said particulate proteinaceous feed material.

2. A composition according to claim 1 wherein said non-proteinaceous nitrogen compound is present in a weight equivalent ratio of 0.25 to 2.0 with respect to a nitrogen equivalent content of said particulate proteinaceous feed material.

3. A composition according to claim 1 wherein said non-proteinaceous nitrogen compound is urea.

4. A composition according to claim 1 wherein said non-proteinaceous nitrogen compound is selected from the group consisting of an amide of carbon dioxide and aliphatic $C_1$–$C_4$ monocarboxylic acid; N-monoacetal urea, N-monopropionyl urea, N, N' dipropionyl urea and salts thereof, guanidine and biuret; aldehyde-urea condensation products wherein the aldehyde is formaldehyde, acetaldehyde, propionaldehyde, isobutylaldehyde and crotonaldehyde; ammonium salts of inorganic or organic acids, ammonium salts of phosphorus containing acids; ammonium salts of nitric acid, sulfuric acid and carbonic acid; the carbamine of acetic, propionic, butyric, lactic, malic, tartaric and fumaric acids and mixtures thereof.

* * * * *